UNITED STATES PATENT OFFICE 2,322,475

ENOLIC DERIVATIVES OF STEROIDS AND A METHOD OF MAKING THE SAME

Walter Schoeller, Berlin-Charlottenburg, and Hans-Herloff Inhoffen, Berlin-Wilmersdorf, Germany, assignors to Schering Corporation, Bloomfield, N. J., a corporation of New Jersey No Drawing. Application May 27, 1939, Serial No. 276,216. In Germany June 1, 1938

11 Claims. (Cl. 260—397.4)

This invention relates to new enolic derivatives of steroids and more particularly to enolic derivatives of this series exhibiting the physiological activity of suprarenal cortical hormones and a method of making the same.

We have found that new enolic derivatives of steroids exhibiting the physiological activity of suprarenal cortical hormones can be obtained by treating compounds of the cyclopentano polyhydro phenanthrene series containing a side chain with an oxo group and a hydroxyl group or groups convertible thereinto, or a further oxo group, at the carbon atom neighbouring the first oxo group, with enolising agents.

As starting materials of this type there may be employed, for instance, compounds of the following formulae $$X-CO.CH_2R$$
$$X-CHR.CH:O$$
$$X-CO.CH:O$$

wherein X is a saturated or unsaturated cyclopentano polyhydrophenanthrene nucleus which may be substituted by other groups, such as hydroxy or oxo groups or groups convertible thereinto, while R is a hydroxy group or a group convertible thereinto as, for instance, an ester or ether group, halogen or the like.

Thus, as starting material there may be employed not only saturated but also unsaturated compounds of the cyclopentano polyhydrophenanthrene series which can be substituted, aside from the above mentioned side-chain, furthermore by other groups, for instance, by hydroxy groups or oxygen, for instance, carbonyl groups or groups convertible thereinto. In the latter case, of course, enolisation not only of the oxo group in the side-chain but also of the oxo groups in the ring system takes place.

Of particular interest as starting materials are compounds having the above described side-chain in the cyclopentano ring in 17-position.

The manufacture of enolic derivatives of the above mentioned starting materials according to the present invention is carried out in a manner known per se, for instance, by the action of alkylating or acylating agents, if necessary in the presence of acid-binding agents. One may also use a two-step process whereby the starting material is first converted by the action of alkali metals or alkali metallic compounds which are capable of splitting off alkali metal very readily, into the corresponding enolic alkali-metal compounds, whereupon the latter are treated, for instance, with acylating or alkylating agents. As acylating agents there may be employed, for instance, organic or inorganic acid halogenides and/or anhydrides or organic acid anhydrides in the presence of salts of the corresponding acid whereby it is advisable to proceed at elevated temperature. The addition of acid-binding agents, as, for instance, pyridine, is of particular advantage in many instances. On employing organic acid halogenides organic esters of the enolic compounds and/or their halogenides may be formed. The first mentioned esters are generally obtained when working in open containers from which the halogen hydride formed can escape, while the halogenides are produced in closed containers. The enolic halogenides which may be obtained thereby can also be converted into enolic esters of organic acids by reaction with the salts of said organic acids.

For manufacturing the enolic alkali-metal compounds the starting material is heated, for instance, with alkali metals as, for instance, sodium, potassium, and lithium and a suitable solvent as, for instance, benzene, toluene, cyclohexane and the like, if necessary, under pressure. Likewise alkali metal alcoholates or phenolates, aliphatic or aromatic alkali metal amides and the like may be allowed to react upon the starting materials at elevated temperature, if necessary, in the presence of suitable solvents as, for instance, the above mentioned solvents or the corresponding alcohols or phenols, whereby the desired enolic alkali-metal compounds are produced.

As acylating agents in this two-step process there may be employed organic or inorganic acid halogenides or anhydrides, as alkylating agents, for instance, alkyl or aryl halogenides and the like.

The following example serves to illustrate the invention without, however, limiting the same to it.

Example 100 mgs. of 21-hydroxy progesterone are heated to slight boiling in a mixture of 2 ccs. of acetic acid anhydride and 3 ccs. of acetyl chloride for 4 hours under nitrogen in a glycerol bath. The bath temperature is increased gradually up to 160° C. whereby the acetyl chloride is distilled off through an air condenser. After evaporating the excess anhydride in a vacuum, the 3,20,21-triacetate of the 21-hydroxy progesterone is obtained in oily condition which can be further purified by recrystallisation from alcohol.

Of course, many changes and variations may be made by those skilled in the art in accordance with the principles set forth herein and in the claims annexed hereto.

What we claim is:

1. A compound of the class consisting of enolic ester, ether, halogen and metal derivatives of steroid compounds having attached to the 17-carbon atom a side chain having an oxo group and a member of the group consisting of a further oxo group at the carbon atom neighboring the first oxo group, a hydroxy group and groups convertible thereinto with the aid of hydrolysis.

2. A compound of the class consisting of enolic ester, ether, halogen and metal derivatives of steroid compounds of the general formula X—Y, wherein X represents a member of the group consisting of saturated and unsaturated cyclopentano polyhydro phenanthrene nuclei which are substituted by a member of the class consisting of the hydroxy group, oxo groups, and groups convertible thereinto with the aid of hydrolysis, while Y is attached to the nuclear carbon atom-17 and represents one of the groups $$-CO-CH_2R$$
$$-CHR-CH=O$$
$$-CO-CH=O$$

wherein R indicates a member of the group consisting of a hydroxy group and groups convertible thereinto with the aid of hydrolysis.

3. Enolic esters of steroid compounds of the cyclopentano polyhydro phenanthrene series having attached to the 17-carbon atom a side chain having an oxo group and a member of the group consisting of a further oxo group at the carbon atom neighboring the first oxo group, a hydroxy group, and groups convertible thereinto with the aid of hydrolysis.

4. Enolic ethers of steroid compounds of the cyclopentano polyhydro phenanthrene series having attached to the 17-carbon atom a side chain having an oxo group and a member of the group consisting of a further oxo group at the carbon atom neighboring the first oxo group, a hydroxy group, and groups convertible thereinto with the aid of hydrolysis.

5. Enolic esters of steroid compounds of the general formula X—Y, wherein X represents a member of the group consisting of saturated and unsaturated cyclopentano polyhydro phenanthrene nuclei which are substituted by a member of the group consisting of the hydroxy group, oxo groups, and groups convertible thereinto with the aid of hydrolysis, while Y is attached to the nuclear carbon atom-17 and represents one of the groups $$-CO-CH_2R$$
$$-CHR-CH=O$$
$$-CO-CH=O$$

wherein R indicates a member of the group consisting of the hydroxy group and groups convertible thereinto with the aid of hydrolysis.

6. Enolic ethers of steroid compounds of the general formula X—Y, wherein X represents a member of the group consisting of saturated and unsaturated cyclopentano polyhydro phenanthrene nuclei which are substituted by a member of the group consisting of the hydroxy group, oxo groups, and groups convertible thereinto with the aid of hydrolysis, while Y is attached to the nuclear carbon atom-17 and represents one of the groups $$-CO-CH_2R$$
$$-CHR-CH=O$$
$$-CO-CH=O$$

wherein R indicates a member of the group consisting of the hydroxy group and groups convertible thereinto with the aid of hydrolysis.

7. Saturated and unsaturated cyclopentano polyhydro phenanthrene compounds having at the 17-carbon the group —CR=CHR', wherein R and R' are members of the class consisting of acid and ether groups.

8. The triester of 21-hydroxy progesterone.

9. The triacetate of 21-hydroxy progesterone.

10. The enolic ester of 21-hydroxy progesterone.

11. The enolic alkali metal derivatives of saturated and unsaturated cyclopentano polyhydro phenanthrene compounds having at the 17-carbon one of the groups $$-CO-CH_2R$$
$$-CHR-CH=O$$
$$-CO-CH=O$$

wherein R indicates a member of the group consisting of a hydroxy group and groups convertible thereinto with the aid of hydrolysis.

WALTER SCHOELLER.
HANS HERLOFF INHOFFEN.